US008886444B2

(12) United States Patent
Holbert et al.

(10) Patent No.: US 8,886,444 B2
(45) Date of Patent: Nov. 11, 2014

(54) BLOCK HEATER DETECTION FOR IMPROVED STARTABILITY

(75) Inventors: Timothy J. Holbert, Clarkston, MI (US); Scott Alan Westfall, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 586 days.

(21) Appl. No.: 13/198,295

(22) Filed: Aug. 4, 2011

(65) Prior Publication Data

US 2013/0035840 A1 Feb. 7, 2013

(51) Int. Cl.
*F02M 1/16* (2006.01)
*F02N 11/08* (2006.01)
*G06F 19/00* (2011.01)

(52) U.S. Cl.
CPC ................ *F02N 11/08* (2013.01); *G06F 19/00* (2013.01)
USPC ................ 701/113; 123/142.5 E; 123/179.16

(58) Field of Classification Search
CPC ..... F02D 41/062; F02D 41/064; F02D 41/06; F02D 41/065; F02D 2200/02; F02D 2200/021; F02D 2200/023; F02N 11/08; F02N 11/0829; F02N 19/10; F02N 19/04; F02N 11/0837; F02P 19/02; F02P 19/026; F02M 1/16
USPC ........ 123/179.3, 179.6, 179.16, 196 AB, 491, 123/435, 142.5 E; 701/103, 105, 113
See application file for complete search history.

(56) References Cited

U.S. PATENT DOCUMENTS

| | | | | |
|---|---|---|---|---|
| 5,781,877 | A * | 7/1998 | Rachel et al. | 701/104 |
| 6,393,357 | B1 * | 5/2002 | Holmes et al. | 701/115 |
| 6,714,854 | B2 * | 3/2004 | Linenberg et al. | 701/113 |
| 6,732,025 | B2 * | 5/2004 | Reese et al. | 701/31.9 |
| 6,931,865 | B1 * | 8/2005 | Van Gilder et al. | 62/129 |
| 7,040,296 | B2 * | 5/2006 | Lee | 123/487 |
| 7,120,535 | B2 * | 10/2006 | Rahman et al. | 701/114 |
| 7,147,366 | B2 * | 12/2006 | Melby et al. | 374/1 |
| 7,162,358 | B2 * | 1/2007 | Gerum et al. | 701/107 |
| 7,277,791 | B2 * | 10/2007 | Petrosius et al. | 701/112 |
| 7,464,681 | B2 * | 12/2008 | Rockwell et al. | 123/179.1 |
| 7,757,649 | B2 * | 7/2010 | Wakahara | 123/142.5 E |
| 7,873,464 | B2 * | 1/2011 | Shartzer et al. | 701/113 |
| 8,140,246 | B1 * | 3/2012 | Manchanda | 701/107 |
| 8,428,853 | B2 * | 4/2013 | Nakashima et al. | 701/107 |
| 2009/0182489 | A1 * | 7/2009 | Yang et al. | 701/113 |
| 2009/0265086 | A1 * | 10/2009 | Iihoshi et al. | 701/113 |
| 2012/0245830 | A1 * | 9/2012 | Eser et al. | 701/113 |

* cited by examiner

*Primary Examiner* — Thomas Moulis
(74) *Attorney, Agent, or Firm* — Quinn Law Group, PLLC

(57) ABSTRACT

A method of starting an internal combustion engine includes sensing a temperature of an engine coolant at an engine block of the internal combustion engine, and sensing a temperature of a secondary engine component remote from the engine block when the internal combustion engine is not running. A numerical difference between the temperature of the engine coolant and the temperature of the secondary engine component is calculated. A start parameter setting used to control the start of the internal combustion engine is adjusted based upon both the sensed temperature of the engine coolant and the numerical difference between the sensed temperature of the engine coolant and the sensed temperature of the secondary engine component.

16 Claims, 1 Drawing Sheet

BLOCK HEATER DETECTION FOR IMPROVED STARTABILITY

TECHNICAL FIELD

The invention generally relates to a method of operating a vehicle, and more specifically to a method of starting an internal combustion engine of the vehicle.

BACKGROUND

Internal combustion engines, and particularly diesel engines, may use a block heater to pre-heat the engine block in cold weather. The vehicle may sense a temperature of an engine coolant to determine the appropriate start parameter settings to apply to the internal combustion engine. The various start parameter settings may include, but are not limited to, a starter cutout time, an engine running threshold, an initial idle torque, a post start glow plug time, a turbine protection wait time, a start torque, an engine timing, or a fuel injection rate. However, the temperature of the engine coolant is not always indicative of engine friction at start. For example, an extreme difference in temperature between the engine coolant and an engine lubricant, i.e., engine oil, may exist when the block heater is engaged. The colder temperature of the engine lubricant increases the engine friction of the internal combustion engine at start, thereby affecting the various start parameter settings.

SUMMARY

A method of operating an internal combustion engine is provided. The method includes sensing a temperature of an engine coolant when the internal combustion engine is not running, and sensing a temperature of a secondary engine component when the internal combustion engine is not running. A numerical difference between the sensed temperature of the engine coolant and the sensed temperature of the secondary engine component is calculated. At least one start parameter setting used to start the internal combustion engine is adjusted to compensate for a low temperature start of the internal combustion engine. The start parameter setting is adjusted based upon the sensed temperature of the engine coolant and the numerical difference between the sensed temperature of the engine coolant and the sensed temperature of the secondary engine component.

A method of starting an internal combustion engine is provided. The method includes sensing a temperature of an engine coolant at an engine block of the internal combustion engine when the internal combustion engine is not running, and sensing a temperature of a secondary engine component remote from the engine block of internal combustion engine when the internal combustion engine is not running. A numerical difference between the sensed temperature of the engine coolant and the sensed temperature of the secondary engine component is calculated. At least one start parameter setting used to start the internal combustion engine is adjusted to compensate for a low temperature start of the internal combustion engine. The start parameter setting is adjusted based upon the sensed temperature of the engine coolant and the numerical difference between the sensed temperature of the engine coolant and the sensed temperature of the secondary engine component. The internal combustion engine is started after adjusting the at least one start parameter setting.

Accordingly, the difference between the temperature of the engine coolant and the temperature of the secondary engine component, e.g., an engine lubricant, along with the temperature of the engine coolant, are used to define and/or adjust the at least one start parameter setting, thereby providing a more robust estimate of the true engine friction of the internal combustion engine at the time of starting the internal combustion engine. The start parameter setting is adjusted to account for the true engine friction to improve cold weather start and idle of the internal combustion engine, and to help protect against hardware damage.

The above features and advantages and other features and advantages of the present invention are readily apparent from the following detailed description of the best modes for carrying out the invention when taken in connection with the accompanying drawings.

DETAILED DESCRIPTION

Figure 1:
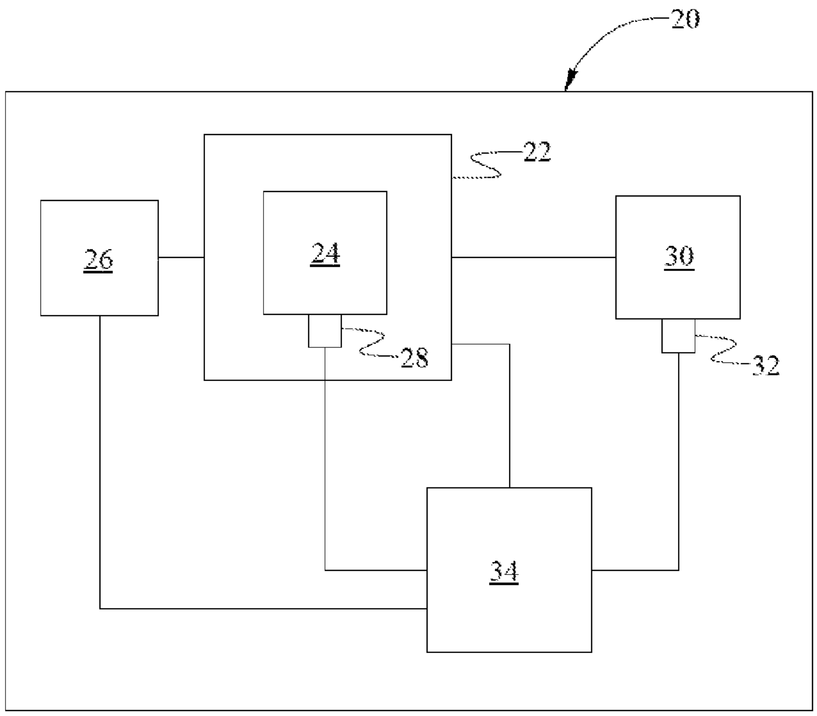
FIG. 1 is a schematic drawing of a vehicle.

Referring to the Figures, wherein like numerals indicate like parts throughout the several views, a vehicle is schematically shown at 20 in FIG. 1. Referring to FIG. 1, the vehicle 20 includes an internal combustion engine 22. The internal combustion engine 22 may include, but is not limited to, a gasoline engine or a diesel engine. The internal combustion engine 22 includes an engine block 24. The engine block 24 defines a plurality of bores, each supporting a reciprocating piston as is known. The internal combustion engine 22 circulates an engine coolant through the engine block 24 for cooling the engine block 24 and other components of the internal combustion engine 22 as is known.

The internal combustion engine 22 further includes a block heater 26. The block heater 26 is configured for heating the engine block 24 during cold weather to improve startability of the internal combustion engine 22. The block heater 26 may include any suitable type of heater, including but not limited to an electrical resistance heater. When operating, the block heater 26 generates thermal energy, which is transferred to the engine block 24 to warm the engine block 24. It should be appreciated that warming of the engine block 24 also warms the engine coolant disposed within the engine block 24.

The vehicle 20 may include a coolant sensor 28 configured for sensing the temperature of the engine coolant. The coolant sensor 28 is preferably positioned to sense the temperature of the engine coolant at the engine block 24. Accordingly, the temperature of the engine coolant within the engine block 24 is related to the temperature of the engine block 24. The coolant sensor 28 may include any suitable style and/or configuration of sensor capable of sensing the temperature of the engine coolant within the engine block 24.

The internal combustion further includes a secondary engine component 30. The secondary engine component 30 may include, but is not limited to, an engine lubricant or an engine fuel. The secondary engine component 30 is located remotely from the engine block 24, i.e., is spaced from the engine block 24 a distance sufficient to prevent thermal heating of the secondary engine component 30 from the block heater 26 when the block heater 26 is engaged to heat the engine block 24. For example, an engine fuel may be disposed within a fuel tank such that heat from the block heater 26 does not affect the temperature of the engine fuel, or an engine lubricant may be disposed in an oil pan such that heat from the block heater 26 does not affect the temperature of the engine lubricant.

The vehicle 20 may include a component sensor 32 configured for sensing the temperature of the secondary engine component 30. The component sensor 32 is preferably positioned to sense the temperature of the secondary engine component 30 remote from the engine block 24. Accordingly, the temperature of the secondary engine component 30 is not related to the temperature of the engine block 24. The component sensor 32 may include any suitable style and/or configuration of sensor capable of sensing the temperature of the secondary engine component 30.

A method of operating the internal combustion engine 22, and more particularly a method of starting the internal combustion engine 22, is provided. The method may be embodied as an algorithm or software operable within a control module 34 or computer of the vehicle 20. The control module 34 may include all memory, hardware, software, communication links, etc. necessary to process and execute the below describe method.

The method includes sensing a temperature of the engine coolant at the engine block 24 of the internal combustion engine 22. The temperature of the engine coolant is sensed prior to starting the internal combustion engine 22, i.e., when the internal combustion engine 22 is not running. The temperature of the engine coolant may be sensed in any suitable manner, including sensing the temperature of the engine coolant with the coolant sensor 28. The temperature of the engine coolant may be continuously sensed, or may be periodically sensed at defined time intervals. The sensed data related to the temperature of the engine coolant at the engine block 24 may be communicated to the control module 34 for processing.

A temperature of the secondary engine component 30 is also sensed. The temperature of the secondary engine component 30 is sensed remotely from the engine block 24 of the internal combustion engine 22. The temperature of the secondary engine component 30 is sensed prior to starting the internal combustion engine 22, i.e., when the internal combustion engine 22 is not running. The temperature of the secondary engine component 30 may be sensed in any suitable manner, including sensing the temperature of the secondary engine component 30 with the component sensor 32. The temperature of the secondary engine component 30 may be continuously sensed, or may be periodically sensed at defined time intervals. The sensed data related to the temperature of the secondary engine component 30 may be communicated to the control module 34 for processing.

A numerical difference between the sensed temperature of the engine coolant and the sensed temperature of the secondary engine component 30 is calculated. The numerical difference indicates the temperature difference between the engine block 24 and the secondary engine component 30. In cold weather situations, the temperature of the secondary engine component 30 is typically equal to or less than the temperature of the engine coolant. The numerical difference may be calculated, for example, by the control module 34, by subtracting the sensed temperature of the secondary engine component 30, e.g., the engine fuel or the engine lubricant, from the sensed temperature of the engine coolant.

The operation of a block heater 26 to heat the internal combustion engine 22, and more specifically to heat the engine block 24, prior to starting the internal combustion engine 22 may be identified from the numerical difference between the temperature of the engine coolant and the temperature of the secondary engine component 30. Because the temperature of the secondary engine component 30 is taken remote from the engine block 24 at a position that is not thermally affected by the block heater 26, a numerical difference equal to zero indicates that the block heater 26 is not currently engaged to heat the engine block 24. A numerical difference greater than zero indicates that the engine block 24 is warmer than the secondary engine component 30, which may be caused by heat being added to the engine block 24 and the engine coolant by the block heater 26. Accordingly, the control module 34 may identify that the block heater 26 is engaged and being operated to heat the engine block 24 when the numerical difference between the sensed temperature of the engine coolant and the sensed temperature of the secondary engine component 30 is greater than a pre-defined value.

The control module 34 may adjust one or more start parameter settings used to start the internal combustion engine 22 based upon the sensed temperature of the engine coolant and the numerical difference between the sensed temperature of the engine coolant and the sensed temperature of the secondary engine component 30. The start parameter settings may be adjusted to compensate for a low temperature start of the internal combustion engine 22. The start parameter setting may include but is not limited to one or more of a starter cutout time, an engine running threshold, an initial idle torque, a post start glow plug time, a turbine protection wait time, a start torque, an engine timing, or a fuel injection rate.

The start parameter setting may be adjusted in any suitable manner capable of improving the startability of the internal combustion engine 22. For example, the start parameter setting may be adjusted by applying a compensation setting to the start parameter setting. Each start parameter setting has a pre-defined value that is applied when starting the internal combustion engine 22. Applying the compensation setting to the start parameter setting modifies the start parameter setting to improve the startability of the internal combustion engine 22 for the actual conditions when the internal combustion engine 22 is started. For example, in cold weather conditions, the glow plug time or the starter cutout time may be increased to improve startability and initial operation of the internal combustion engine 22.

Figure 2:
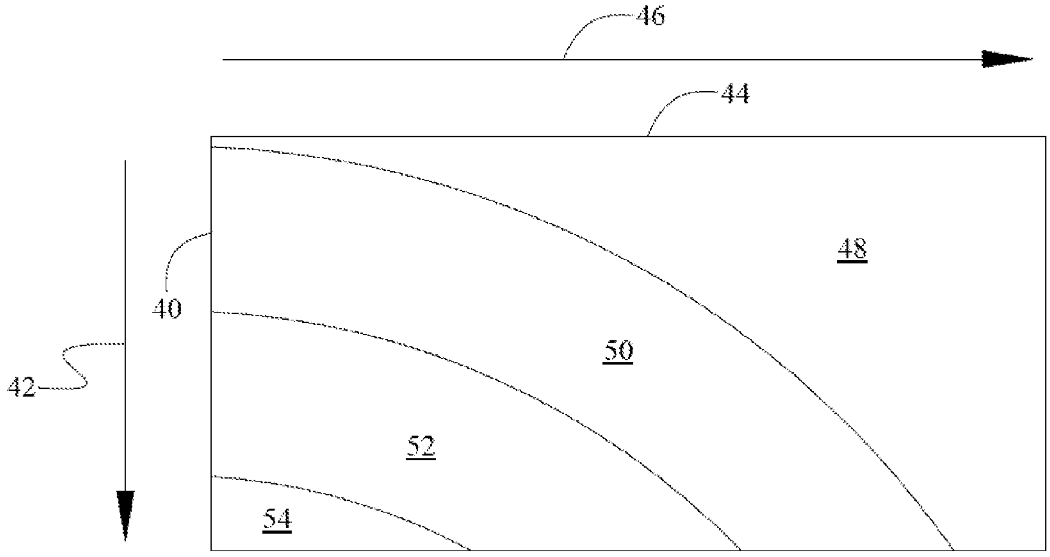
FIG. 2 is a chart showing varying degrees of start parameter setting adjustment based upon a temperature of an engine coolant (shown on a horizontal axis) and a temperature difference between the engine coolant and a secondary engine component (shown on a vertical axis).

Referring to FIG. 2, a value of the compensation setting may increase in magnitude with an increase in the numerical difference between the sensed temperature of the engine coolant and the sensed temperature of the secondary engine component 30. The numerical difference is shown in a vertical axis 40 of FIG. 2, and increases in magnitude in a direction indicated by arrow 42. Furthermore, the value of the compensation setting may increase in magnitude with a decrease in the temperature of the engine coolant. The temperature of the engine coolant is shown on a horizontal axis 44 of FIG. 2, and increases in magnitude in a direction indicated by arrow 46. As shown in FIG. 2, the control module 34 may be configured to apply different compensation settings for differing conditions. For example, a first zone 48 representing no numerical difference or a small value in the numerical difference as the temperature of the engine coolant increases may require no compensation settings, with the original start parameter settings used to start the internal combustion engine 22. A second zone 50 may be defined for a pre-defined range of the numerical difference as the temperature of the engine coolant increases, with the start parameter settings being adjusted to a first degree. Similarly, a third zone 52 and a fourth zone 54 may also be defined for respective pre-defined ranges of the numerical difference as the temperature of the engine coolant increases. If the combination of the numerical difference and the temperature of the engine coolant fall within the third zone 52, then the start parameter settings may be adjusted to a second degree. Similarly, if the combination of the numerical difference and the temperature of the engine coolant fall within the fourth zone 54, then the start parameter settings may be adjusted to a third degree. The amount of adjustment, i.e., the first degree, the second degree or the third degree, may include pre-defined values stored in the control module 34, and/or may include adjusting multiple start parameter settings, with the value of the pre-defined values and/or the number of start parameter settings adjusted increasing from the first degree of adjustment to the third degree of adjustment.

Once the start parameter settings have been adjusted based upon the numerical difference and the engine coolant temperature, then the internal combustion engine 22 may be started. The internal combustion engine 22 may be started in any suitable manner known to those skilled in the art, and as such is not described in detail herein.

While the best modes for carrying out the invention have been described in detail, those familiar with the art to which this invention relates will recognize various alternative designs and embodiments for practicing the invention within the scope of the appended claims.

The invention claimed is:

1. A method of operating an internal combustion engine, the method comprising:

sensing a temperature of an engine coolant when the internal combustion engine is not running;

sensing a temperature of a secondary engine component when the internal combustion engine is not running;

calculating a numerical difference between the sensed temperature of the engine coolant and the sensed temperature of the secondary engine component; and adjusting at least one start parameter setting used to start the internal combustion engine to compensate for a low temperature start of the internal combustion engine, wherein a magnitude of the adjustment is based upon the sensed temperature of the engine coolant and the numerical difference between the sensed temperature of the engine coolant and the sensed temperature of the secondary engine component.

2. A method as set forth in claim 1 wherein adjusting at least one start parameter setting includes applying a compensation setting to the at least one start parameter setting.

3. A method as set forth in claim 2 wherein a value of the compensation setting increases in magnitude with an increase in the numerical difference between the sensed temperature of the engine coolant and the sensed temperature of the secondary engine component.

4. A method as set forth in claim 3 wherein the value of the compensation setting increases in magnitude with a decrease in the temperature of the engine coolant.

5. A method as set forth in claim 1 wherein the secondary engine component includes an engine component that is not thermally affected by a block heater configured for heating an engine block of the internal combustion engine.

6. A method as set forth in claim 5 wherein the secondary engine component includes one of a fuel for the internal combustion engine or a lubricant for the internal combustion engine, wherein the fuel is stored in a fuel tank located remotely from the engine block of the internal combustion engine such that the temperature of the fuel in the fuel tank is not thermally affected by the block heater, and wherein the lubricant for the internal combustion engine is stored in a sump such that the temperature of the lubricant in the sump is not thermally affected by the block heater.

7. A method as set forth in claim 1 wherein sensing a temperature of the secondary engine component is further defined as sensing the temperature of the secondary engine component remote from the internal combustion engine.

8. A method as set forth in claim 1 further comprising starting the internal combustion engine after adjusting the at least one start parameter setting.

9. A method as set forth in claim 1 wherein the at least one start parameter setting includes one of a starter cutout time, an engine running threshold, an initial idle torque, a post start glow plug time, a turbine protection wait time, a start torque, an engine timing, or a fuel injection rate.

10. A method as set forth in claim 1 further comprising identifying the operation of a block heater to heat the internal combustion engine prior to starting the internal combustion engine when the numerical difference between the sensed temperature of the engine coolant and the sensed temperature of the secondary engine component is greater than a pre-defined value.

11. A method of starting an internal combustion engine, the method comprising:

sensing a temperature of an engine coolant at an engine block of the internal combustion engine when the internal combustion engine is not running;

sensing a temperature of a secondary engine component that is not thermally affected by a block heater operable to heat the engine block of the internal combustion engine, when the internal combustion engine is not running;

calculating a numerical difference between the sensed temperature of the engine coolant and the sensed temperature of the secondary engine component;

adjusting at least one start parameter setting used to start the internal combustion engine to compensate for a low temperature start of the internal combustion engine, wherein a magnitude of the adjustment is based upon the sensed temperature of the engine coolant and the numerical difference between the sensed temperature of the engine coolant and the sensed temperature of the secondary engine component; and starting the internal combustion engine after adjusting the at least one start parameter setting.

12. A method as set forth in claim 11 wherein the at least one start parameter setting includes one of a starter cutout time, an engine running threshold, an initial idle torque, a post start glow plug time, a turbine protection wait time, a start torque, an engine timing, or a fuel injection rate.

13. A method as set forth in claim 12 wherein adjusting at least one start parameter setting includes applying a compensation setting to the at least one start parameter setting.

14. A method as set forth in claim 13 wherein a value of the compensation setting increases in magnitude with an increase in the numerical difference between the sensed temperature of the engine coolant and the sensed temperature of the secondary engine component.

15. A method as set forth in claim 14 wherein the value of the compensation setting increases in magnitude with a decrease in the temperature of the engine coolant.

16. A method as set forth in claim 15 wherein the secondary engine component includes one of a fuel for the internal combustion engine or a lubricant for the internal combustion engine, wherein the fuel is stored in a fuel tank located remotely from the engine block of the internal combustion engine such that the temperature of the fuel in the fuel tank is not thermally affected by the block heater, and wherein the lubricant for the internal combustion engine is stored in a sump such that the temperature of the lubricant in the sump is not thermally affected by the block heater.

* * * * *